United States Patent [19]

Klinedinst et al.

[11] Patent Number: 4,844,997
[45] Date of Patent: Jul. 4, 1989

[54] ELECTROCHEMICAL CELL

[75] Inventors: Keith A. Klinedinst, Marlborough; William D. K. Clark, Wayland, both of Mass.

[73] Assignee: Whittaker Technical Products, Inc., Los Angeles, Calif.

[21] Appl. No.: 538,465

[22] Filed: Oct. 3, 1983

[51] Int. Cl.$^4$ .............................................. H01M 6/14
[52] U.S. Cl. .................................... 429/196; 429/197; 429/199
[58] Field of Search ......................... 429/196, 197, 199

[56] References Cited

U.S. PATENT DOCUMENTS

| | | | |
|---|---|---|---|
| 3,891,457 | 6/1975 | Auborn | 136/6 LN |
| 3,897,264 | 7/1975 | Auborn | 136/6 LN |
| 4,012,564 | 3/1977 | Auborn | 429/196 |
| 4,037,025 | 7/1977 | Dey et al. | 429/29 |
| 4,143,214 | 3/1979 | Chang et al. | 429/196 |
| 4,263,378 | 4/1981 | Feiman et al. | 429/196 |
| 4,352,866 | 10/1982 | Klinedinst et al. | 429/101 |
| 4,375,501 | 3/1983 | Peled et al. | 429/197 |
| 4,403,021 | 9/1983 | Domeniconi et al. | 429/199 |
| 4,465,743 | 8/1984 | Skarstad et al. | 429/196 |
| 4,476,204 | 10/1984 | Auborn | 429/196 |
| 4,547,441 | 10/1985 | Vallin et al. | 429/197 |

Primary Examiner—Edward A. Miller
Attorney, Agent, or Firm—Donald E. Nist

[57] ABSTRACT

A primary electrochemical cell having an oxidizable active anode material, a cathode current collector, and an electrolytic solution comprising a liquid cathode material and an electrolyte solute dissolved therein. The solute consists of the reaction product of a Lewis acid, a first Lewis base, and a second Lewis base. In a specific embodiment the anode material is lithium, the liquid cathode material is thionyl chloride, the Lewis acid is aluminum chloride, the first Lewis base is lithium iodide, and the second Lewis base is lithium chloride.

23 Claims, 2 Drawing Sheets

ELECTROCHEMICAL CELL

BACKGROUND OF THE INVENTION

This invention relates to electrochemical cells. More particularly, it is concerned with primary electrochemical cells having an oxidizable active anode material, a cathode current collector, and an electrolytic solution comprising a reducible liquid cathode material and an electrolyte solute dissolved therein.

A particularly effective class of primary electrochemical cells which employs soluble or liquid cathode materials, as opposed to the more conventional solid cathode cells, has undergone rapid development in recent years. In these cells, the active cathode material is usually a fluid solvent for an electrolyte solute which provides conductivity. The active anode of the cell is usually lithium or other highly electropositive metal. During discharge the solvent is electrochemically reduced on a cathode current collector.

One particular type of electrochemical cell of the foregoing class which contains a lithium anode employs a reducible liquid cathode of thionyl chloride. Typically the electrolyte solute dissolved in the thionyl chloride solvent is lithium tetrachloroaluminate. This salt is usually prepared from the Lewis acid aluminum chloride and the Lewis base lithium chloride. A Lewis acid is any compound capable of entering into a chemical reaction by accepting an electron pair to form a covalent bond, and a Lewis base is any compound capable of entering into a chemical reaction by donating an electron pair to form a covalent bond. Lithium/thionyl chloride electrochemical cells have proven to have outstanding weight and volume energy density, long shelf life, and unusually high power density when compared with other cells previously available.

SUMMARY OF THE INVENTION

An electrochemical cell in accordance with the present invention which provides improved output voltage and output capacity comprises an oxidizable anode material, a cathode current collector, and an electrolytic solution in contact with the anode material and the cathode current collector. The electrolytic solution comprises a reducible liquid cathode material and an electrolyte solute consisting of the reaction product of a Lewis acid, a first Lewis base, and a second Lewis base. The first Lewis base is an alkali metal or alkaline earth metal iodide, and the second Lewis base is a bromide or chloride. The molar relationship between the first Lewis base and the second Lewis base is expressed as X M first Lewis base Y M second Lewis base where the mole fraction $X/X+Y$ is greater than 0 and less than 1.

Figure 1:
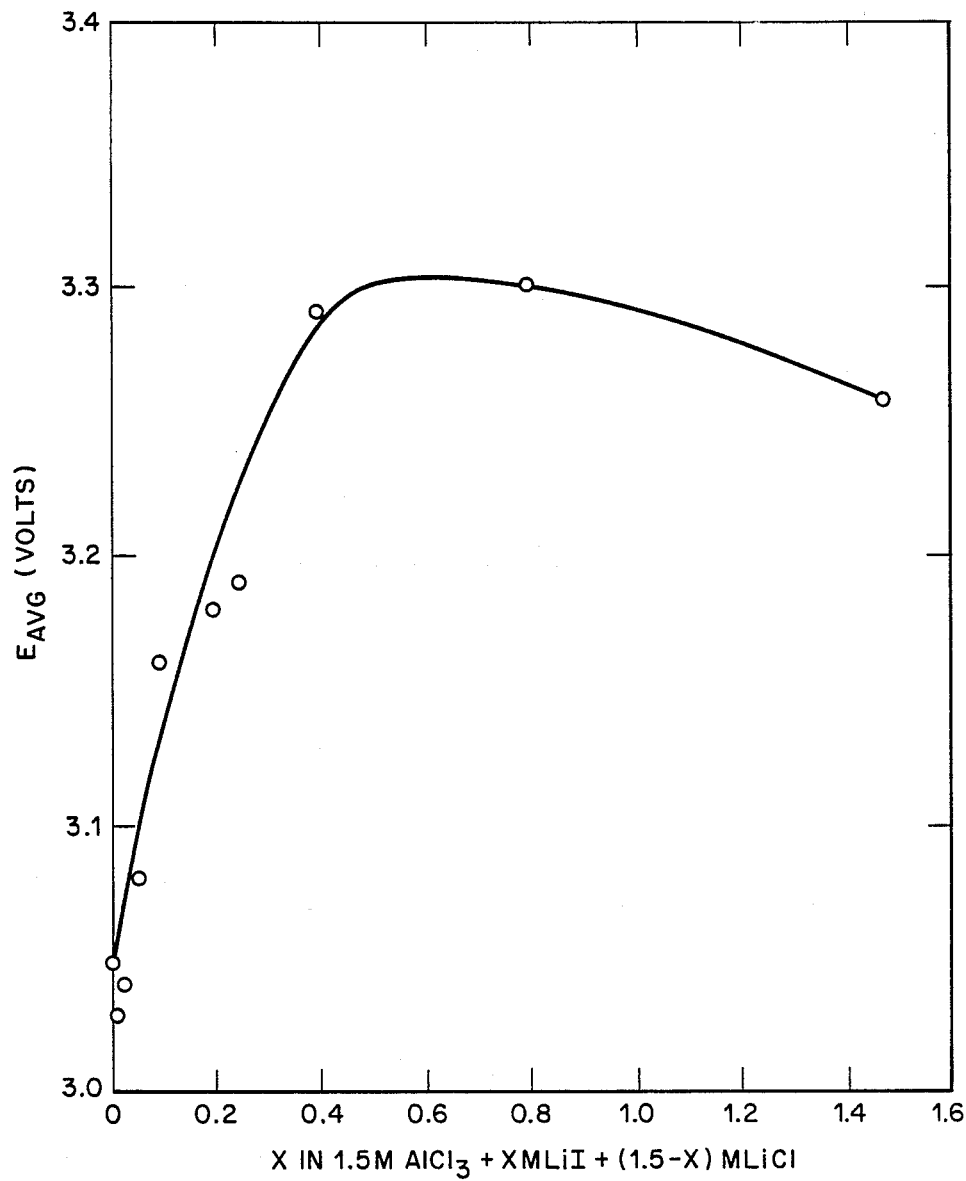
FIG. 1 is a graph illustrating the relationships between the output voltage of electrochemical cells in accordance with the invention and the relative concentrations of the two Lewis bases in the solute.

For a better understanding of the present invention, together with other and further objects, advantages, and capabilities thereof, reference is made to the following discussion and appended claims in connection with the above-described drawings.

DETAILED DESCRIPTION OF THE DRAWINGS

Electrochemical cells in accordance with the present invention employ an anode, a cathode current collector, and an electrolytic solution which is in contact with the anode and cathode current collector. The anode and cathode current collector are separated from each other as by a thin porous layer of insulating material. The electrolytic solution comprises a fluid, reducible solvent cathode material with an electrolyte solute dissolved therein.

The anode is an oxidizable material and is preferably lithium metal. Other oxidizable materials which may be employed in electrochemical cells of this type include other alkali metals and also alkaline earth metals. The electrolytic solution comprises a solvent of a reducible liquid cathode material. Among the cathode materials found useful are fluid oxyhalides, fluid non-metallic oxides, fluid non-metallic halides, and mixtures thereof. Thionyl chloride ($SOCl_2$) is a preferred liquid cathode material.

In accordance with the present invention the electrolytic solution includes a solute consisting of the reaction products of a Lewis acid, a first Lewis base, and a second Lewis base dissolved in the solvent. Preferably the Lewis acid may be $AlCl_3$, $AlBr_3$, $AlI_3$, $BCl_3$, $BF_3$, $BBr_3$, $BI_3$, $PF_5$, $AsF_5$, $SbF_5$, $SbCl_5$, $SnCl_4$, $TiCl_4$, $ZrCl_4$, $GaCl_3$, $GaF_3$, $GaBr_3$, $GaI_3$, $InCl_3$, $InF_3$, $InBr_3$, $InI_3$, $SiF_4$, or $GeCl_4$. The first Lewis base is an alkali metal or alkaline earth metal iodide, preferably the iodide of the anode material, more specifically in a preferred embodiment lithium iodide (LiI). The second Lewis base is a bromide or chloride, preferably of the anode material, and in a specific embodiment lithium chloride (LiCl). The molarity of the solute in the solution is usually from about 0.5 to about 2.5 M. In lithium/thionyl chloride cells the molarity of the solute is preferably from about 1.5 to about 2.0M.

The following examples are for the purpose of further illustrating and explaining the present invention, and are not to be taken as limiting the scope thereof.

Electrochemical cells of the following examples employed lithium anodes and cathode current collectors of Shawinigan acetylene black having dimensions of 1 $cm^2$ by 1 mm thick. The reducible liquid solvent was thionyl chloride ($SOCl_2$). The solute was the reaction product of aluminum chloride ($AlCl_3$), lithium iodide (LiI), and lithium chloride (LiCl) dissolved in the thionyl chloride. As indicated in Table I the molar relationships or mole fractions of the lithium iodide and lithium chloride differed in each of the Examples I-X. The cells were discharged to termination at ambient temperature through 100 ohm loads, yielding current density in excess of 30 $mA/cm^2$. Capacity was determined to a cut-off voltage of 2.8 volts.

As indicated in Table I Examples I-X employed an electrolytic solution of 1.5 M $AlCl_3$+X M LiI+(1.5-X) M LiCl in $SOCl_2$. The constituents of the solute were stoichiometrically in balance. Table I shows the results obtained with cells in which the value of X was from 0.00, that is no lithium iodide and 1.5M lithium chloride, to 1.5, that is 1.5 M lithium iodide and no lithium chloride. For each example the relationship between the lithium iodide and lithium chloride is also expressed as the mole fraction of lithium iodide to lithium iodide plus lithium chloride (X/b 1.5).

TABLE I

Electrolytic solution of
1.5 M $AlCl_3$ + X M LiI + (1.5-X) M LiCl in $SOCl_2$.

| Example | X(M) | Mole Fraction (X/1.5) | $E_{avg}$ (Volts) | $I_{avg}$ (mA/cm$^2$) | Capacity (mAh/cm$^2$) |
|---|---|---|---|---|---|
| I | 0.00 | 0.000 | 3.01 | 30.1 | 27.0 |
| II | 0.010 | 0.007 | 3.00 | 30.0 | 36.7 |
| III | 0.025 | 0.017 | 3.01 | 30.1 | 35.3 |
| IV | 0.050 | 0.033 | 3.05 | 30.5 | 42.8 |
| V | 0.10 | 0.067 | 3.10 | 31.0 | 50.3 |
| VI | 0.20 | 0.133 | 3.12 | 31.2 | 50.3 |
| VII | 0.25 | 0.167 | 3.13 | 31.3 | 52.2 |
| VIII | 0.40 | 0.267 | 3.24 | 32.4 | 46.0 |
| IX | 0.80 | 0.533 | 3.24 | 32.4 | 44.5 |
| X | 1.50 | 1.000 | 3.22 | 32.2 | 36.6 |

As can be seen from Table I and the voltage curve of FIG. 1 the maximum output voltage was obtained from Examples VIII and IX, in which the solute included 0.4 M lithium iodide and 1.1 M lithium chloride, and 0.8 M lithium iodide and 0.7 M lithium chloride, respectively; the mole fraction of the lithium iodide with respect to both the Lewis bases was 0.267 and 0.533, respectively.

Figure 2:
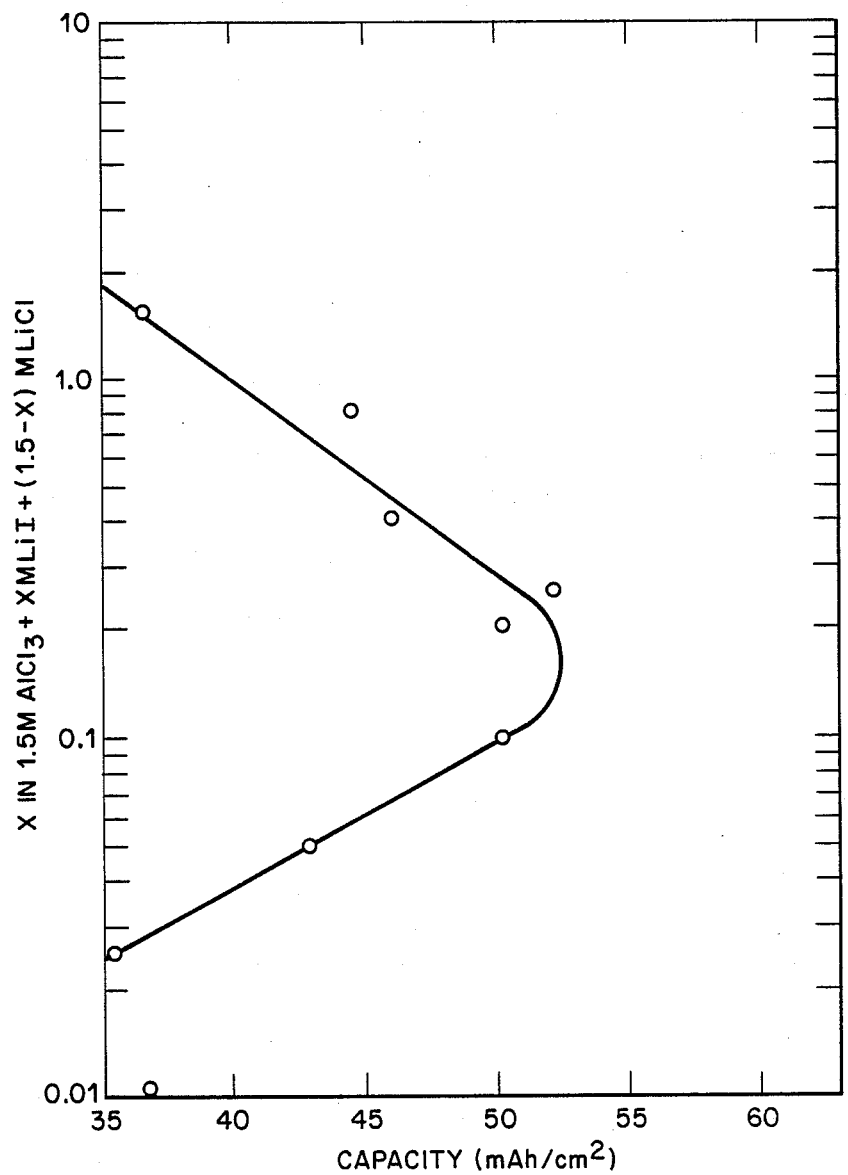
FIG. 2 is a graph illustrating the relationships between the capacity of electrochemical cells in accordance with the invention and the relative concentrations of the two Lewis bases present in the solute.

FIG. 2 is a graph of the data from Table I illustrating the capacity of the cells with respect to the molar concentration (X) of the lithium iodide on a logarithmic scale. As determined from FIG. 2 the optimum capacity was obtained in Examples V, VI, and VII in which the solute included 0.1M lithium iodide and 1.4 M lithium chloride, 0.2 M lithium iodide and 1.3 M lithium chloride, and 0.25 M lithium iodide and 1.25 M lithium chloride, respectively; the mole fraction of the lithium iodide to the total of both Lewis bases was 0.067, 0.133, and 0.167, respectively. As indicated by Table I and FIGS. 1 and 2 improved characteristics were obtained in Examples II-IX in which the mole fraction of lithium iodide to the total of both Lewis bases varied from 0.007 to 0.533. Both load voltage and capacity increased and subsequently decreased as the relative amount of iodide atoms increased. However, the optimum load voltage and capacity were not achieved with the same relative amounts of iodide atoms and chloride atoms.

While there have been shown and described what are considered preferred embodiments of the present invention, it will be obvious to those skilled in the art that various changes and modifications may be made therein without departing from the invention as defined by the appended claims.

What is claimed is:

1. An electrochemical cell comprising
an oxidizable anode material;
a cathode current collector;
an electrolytic solution, in contact with the anode material and the cathode current collector, comprising a reducible liquid cathode material and an electrolyte solute consisting of the reaction product of a Lewis acid, a first Lewis base, and a second Lewis base;
wherein
said first Lewis base is an alkali metal or alkaline earth metal iodide;
said second Lewis base is a bromide or chloride;
the molar relationship between the first Lewis base and the second Lewis base is expressed as X M first Lewis base, Y M second Lewis base, where the mole fraction X/X+Y is greater than 0 and less than 1.

2. An electrochemical cell in accordance with claim 1 wherein
the Lewis acid is selected from the group consisting of $AlCl_3$, $AlBr_3$, $AlI_3$, $BCl_3$, $BF_3$, $BBr_3$, $BI_3$, $PF_5$, $AsF_5$, $SbF_5$, $SbCl_5$, $SnCl_4$, $TiCl_4$, $ZrCl_4$, $GaCl_3$, $GaF_3$, $GaBr_3$, $GaI_3$, $InCl_3$, $InF_3$, $InBr_3$, $InI_3$, $SiF_4$, and $GeCl_4$.

3. An electrochemical cell in accordance with claim 2 wherein
the reducible liquid cathode material is selected from the group consisting of fluid oxyhalides, fluid non-metallic oxides, fluid non-metallic halides, and mixtures thereof.

4. An electrochemical cell in accordance with claim 3 wherein
the oxidizable anode material is an alkali metal or an alkaline earth metal.

5. An electrochemical cell in accordance with claim 4 wherein
the mole fraction X/X+Y is between 0.007 and 0.533.

6. An electrochemical cell in accordance with claim 5 wherein
the oxidizable anode material is lithium.

7. An electrochemical cell in accordance with claim 6 wherein
the Lewis acid is aluminum chloride;
the first Lewis base is lithium iodide; and
the second Lewis base is lithium chloride.

8. An electrochemical cell in accordance with claim 7 wherein
the combined molar concentration of the Lewis bases is approximately equal to the molar concentration of the Lewis acid.

9. An electrochemical cell in accordance with claim 8 wherein
the reducible liquid cathode material is thionyl chloride.

10. An electrochemical cell in accordance with claim 1 wherein
the mole fraction X/X+Y is between 0.267 and 0.533.

11. An electrochemical cell in accordance with claim 10 the Lewis acid is selected from the group consisting of $AlCl_3$, $AlBr_3$, $AlI_3$, $BCl_3$, $BF_3$, $BBr_3$, $BI_3$, $PF_5$, $AsF_5$, $SbF_5$, $SbCl_5$, $SnCl_4$, $TiCl_4$, $ZrCl_4$, $GaCl_3$, $GaF_3$, $GaBr_3$, $GaI_3$, $InCl_3$, $InF_3$, $InBr_3$, $InI_3$, $SiF_4$, and $GeCl_4$.

12. An electrochemical cell in accordance with claim 11 wherein
the oxidizable anode material is an alkali metal or an alkaline earth metal; and
the reducible liquid cathode material is selected from the group consisting of fluid oxyhalides, fluid non-metallic oxides, fluid non-metallic halides, and mixtures thereof.

13. An electrochemical cell in accordance with claim 12 wherein
the oxidizable anode material is lithium.

14. An electrochemical cell in accordance with claim 13 wherein
the Lewis acid is aluminum chloride;
the first Lewis base is lithium iodide; and the second Lewis base is lithium chloride.

15. An electrochemical cell in accordance with claim 14 wherein the combined molar concentration of the Lewis bases is approximately equal to the molar concentration of the Lewis acid.

16. An electrochemical cell in accordance with claim 15 wherein the reducible liquid cathode material is thionyl chloride.

17. An electrochemical cell in accordance with claim 1 wherein the mole fraction $X/X+Y$ is between 0.067 and 0.167.

18. An electrochemical cell in accordance with claim 17 wherein the Lewis acid is selected from the group consisting of $AlCl_3$, $AlBr_3$, $AlI_3$, $BCl_3$, $BF_3$, $BBr_3$, $BI_3$, $PF_5$, $AsF_5$, $SbF_5$, $SbCl_5$, $SnCl_4$, $TiCl_4$, $ZrCl_4$, $GaCl_3$, $GaF_3$, $GaBr_3$, $GaI_3$, $InCl_3$, $InF_3$, $InBr_3$, $InI_3$, $SiF_4$, and $GeCl_4$.

19. An electrochemical cell in accordance with claim 18 wherein the oxidizable anode material is an alkali metal or an alkaline earth metal; and the reducible liquid cathode material is selected from the group consisting of fluid oxyhalides, fluid non-metallic oxides, fluid non-metallic halides, and mixtures thereof.

20. An electrochemical cell in accordance with claim 19 wherein the oxidizable anode material is lithium.

21. An electrochemical cell in accordance with claim 20 wherein the Lewis acid is aluminum chloride;

the first Lewis base is lithium iodide; and the second Lewis base is lithium chloride.

22. An electrochemical cell in accordance with claim 21 wherein the combined molar concentration of the Lewis bases is approximately equal to the molar concentration of the Lewis acid.

23. An electrochemical cell in accordance with claim 22 wherein the reducible liquid cathode material is thionyl chloride.

\* \* \* \* \*